(12) United States Patent
Baldon et al.

(10) Patent No.: US 7,823,865 B2
(45) Date of Patent: Nov. 2, 2010

(54) AIR HUMIDIFICATION SYSTEM FOR LARGE ENCLOSED SPACES AND HUMIDIFICATION MODULE USABLE IN SUCH SYSTEM

(75) Inventors: Stefano Baldon, Correzzola (IT); Michele Martello, Brugine (IT); Luigi Nalini, Padua (IT)

(73) Assignee: Carel S.p.A., Brugine (IT)

( * ) Notice: Subject to any disclaimer, the term of this patent is extended or adjusted under 35 U.S.C. 154(b) by 926 days.

(21) Appl. No.: 11/707,991

(22) Filed: Feb. 20, 2007

(65) Prior Publication Data

US 2007/0194469 A1     Aug. 23, 2007

(30) Foreign Application Priority Data

Feb. 21, 2006   (IT) .......................... PD2006A0051

(51) Int. Cl.
   *B01F 3/04*        (2006.01)
(52) U.S. Cl. .......................... 261/28; 261/78.2; 261/84; 261/116
(58) Field of Classification Search ................... 261/28, 261/30, 78.2, 84, 115, 116, DIG. 34, DIG. 39
   See application file for complete search history.

(56) References Cited

U.S. PATENT DOCUMENTS

| | | | | |
|---|---|---|---|---|
| 1,866,650 | A | * | 7/1932 | Hill .............................. 96/264 |
| 2,228,484 | A | * | 1/1941 | Ramsaur et al. ................ 62/310 |
| 3,799,517 | A | * | 3/1974 | Tamm .......................... 261/128 |
| 4,299,784 | A | * | 11/1981 | Hense ......................... 261/78.2 |
| 5,277,707 | A | * | 1/1994 | Munk et al. ....................... 95/8 |
| 5,702,648 | A | * | 12/1997 | White et al. ................. 261/142 |
| 6,325,362 | B1 | * | 12/2001 | Massey et al. .............. 261/127 |
| 6,367,278 | B1 | | 4/2002 | Strussion et al. |
| 6,786,701 | B1 | | 9/2004 | Huang et al. |
| 6,899,322 | B2 | * | 5/2005 | Sadykhov .................. 261/78.2 |

FOREIGN PATENT DOCUMENTS

| EP | 1 316 761 A | 6/2003 |
|---|---|---|
| EP | 1 512 920 A | 3/2005 |
| FR | 2 819 043 A | 7/2002 |

\* cited by examiner

*Primary Examiner*—Scott Bushey
(74) *Attorney, Agent, or Firm*—Modiano & Associati; Albert Josif; Daniel J. O'Byrne

(57) ABSTRACT

An air humidification system for large enclosed spaces, comprising at least one humidification line constituted by at least one humidification module comprising a box-like container with a water flow pipe inside which is functionally connected at its inlet to a water pump and at its outlet to a water discharge space. The pipe has, along its extension, a plurality of nozzles adapted to provide a water aerosol. The nozzles are open onto a first opening provided in the box-like container and are oriented toward the outside of the first opening. A cross-flow impeller is provided within the box-like container along a rotation axis which is parallel to the pipe and is suitable to aspirate air from a second opening of the box-like container and direct it toward the first opening.

22 Claims, 3 Drawing Sheets

Figure 1:
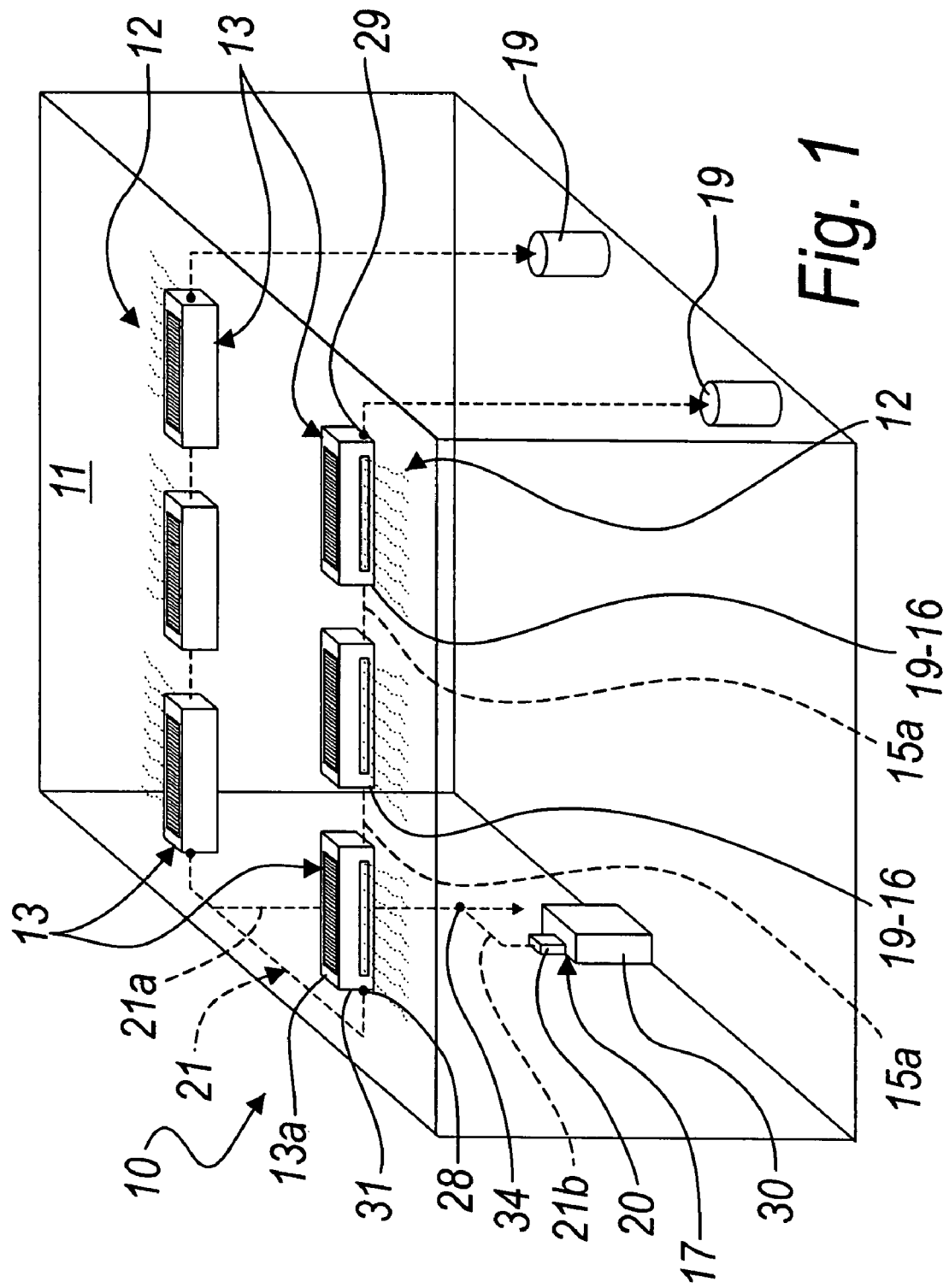

AIR HUMIDIFICATION SYSTEM FOR LARGE ENCLOSED SPACES AND HUMIDIFICATION MODULE USABLE IN SUCH SYSTEM

The present invention relates to an air humidification system for large enclosed spaces and to a humidification module which can be used in such system.

BACKGROUND OF THE INVENTION

In many industrial environments, such as for example in the case of the textile, printing, woodworking industries and in other environments, such as preservation cells for fruit and vegetables, as well as in storage areas for paper, wood, et cetera, it is necessary to control ambient humidity.

Enclosed spaces of this type are humidified but also cooled generally by using humidification systems which are constituted by pipes which are suspended from the ground and are connected to means for pumping water.

Nozzles are provided along said pipes and are designed to create a water aerosol which diffuses into the environment, humidifying the air.

To allow the air to absorb the water particles, their path of descent must be long enough.

The length of this path depends on the environmental parameters of the environment (humidity and temperature).

This path is typically parabolic, and therefore, during installation, in view of the ranges of the typical environmental parameters at which the system is to operate, it is necessary to calculate the correct height at which the pipes must be arranged so that the aerosol does not fall to the ground without being absorbed by the air, wetting the floor.

In some enclosed spaces, due to the limited height of the ceiling, it might not be possible to install the pipes at the optimum height, with evident problems regarding poor air humidification and the inevitable presence of water on the ground, at least in the presence of ranges of the environmental parameters.

In order to solve these problems, individual humidification modules are sometimes used which are connected to a common pumping system and are distributed in the appropriate regions of the enclosed space to be humidified.

These humidification modules are constituted generally by a duct which has an inlet for the water under pressure and an outlet constituted by one or more nozzles suitable to provide the aerosol.

Ventilation means of various kinds are provided behind the duct and are intended to create an air flow in a horizontal direction which is substantially parallel to the ejection axis of the nozzles, so as to strike the aerosol, extending the path of the water particles in a horizontal direction and consequently increasing their absorption in the air.

However, these modules, as well as systems of the traditional type in which the nozzles are arranged along simple pipes which are raised from the ground and are not associated with ventilation means, have the problem of dripping when the humidification system is stopped.

When the pumps that supply the water are stopped, the pressure in the pipes in fact does not drop instantly and therefore water at a pressure which is not sufficient to create a good aerosol tends to flow out of the nozzles (even if they are provided with valves which open at a minimum preset pressure level of the ejected stream, for example by means of a spherical flow control element associated with a suitably calibrated spring), introducing into the enclosed space water particles which are too heavy and cannot be absorbed even in the presence of an air stream which extends their path.

SUMMARY OF THE INVENTION

The aim of the present invention is to provide a humidification system which allows to solve the drawbacks observed in known types.

Within this aim, an object of the present invention is to provide a humidification module which allows to avoid spreading water on the ground both during operation and when operation is interrupted.

Another object of the present invention is to provide a humidification module which is structurally simple and can be assembled easily to provide humidification systems.

This aim and these and other objects, which will become better apparent hereinafter, are achieved by an air humidification system for large enclosed spaces, characterized in that it comprises at least one humidification line, which is constituted by at least one humidification module, which in turn comprises a box-like container inside which there is a water flow pipe which is functionally connected at its inlet to water pumping means and at its outlet to a water discharge space, said pipe having, along its extension, a plurality of nozzles which are adapted to provide a water aerosol, said nozzles being substantially open onto a first opening provided in said box-like container and being oriented toward the outside of said first opening, an impeller being provided within said box-like container and being suitable to aspirate air from at least one second opening of said box-like container toward said first opening, a water flow control valve being associated with the inlet of said pipe of a said at least one humidification module arranged at the inlet of said line, a water discharge valve being associated with the outlet of said pipe of a said at least one humidification module arranged at the outlet of said line.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein:

FIG. 1 is a schematic perspective view of a humidification system according to the invention;

FIG. 2 is a schematic perspective view of a humidification module according to the invention;

FIG. 3 is a schematic transverse sectional view of a humidification module according to the invention.

DESCRIPTION OF THE PREFERRED EMBODIMENTS

It is noted that anything found to be already known during the patenting process is understood not to be claimed and to be the subject of a disclaimer.

With reference to the figures, a humidification system according to the invention is generally designated by the reference numeral 10.

FIG. 1 illustrates the humidification system 10 installed within a large room 11.

The system 10 comprises, in this configuration, two parallel humidification lines 12, which are arranged at a certain height from the ground transversely to the room 11; each line 12 comprises, in this configuration, three humidification modules 13 which are connected in series to each other.

Each humidification module 13 comprises a box-like container 14, which is shaped like a parallelepiped and inside which there is a water passage pipe 15, which is functionally (so as to perform a function, namely water conveyance) connected at its inlet 16 to water pumping means 17 and at its outlet 18 to a water discharge space 19.

As mentioned, on each humidification line 12 the modules 13 are in series with respect to each other for an inlet-to-outlet connection of the respective pipes 15 by means of additional connecting pipes 15a, so that the water discharge space 19 corresponds to the inlet of the pipe of the adjacent humidification module if the pipe 15 is related to one of the first two modules 13 of the corresponding line 12; if instead the pipe 15 is related to the last humidification module of the series of the corresponding line, the water discharge space is for example a pipe for collection and discharge into public sewers.

In this configuration, the water pumping means 17 comprise a volumetric pump 20, which is connected by means of a duct 21 to the two humidification lines 12 and is shown in broken lines in FIG. 1.

In particular, the duct 21 has a vertical portion 21a for connection to the humidification lines 12 and a portion 21b for connecting the volumetric pump 20 to the vertical portion 21a.

The box-like container 14 has a shape which is elongated in a main direction and, in this embodiment, is arranged in a substantially horizontal configuration.

In other embodiments, each module 13 can be arranged according to a preferred spatial orientation, for example with the box-like container 14 extended vertically or even at an angle.

The pipe 15 of each humidification module 13 protrudes so as to match the extension of the box-like container 14 and therefore in this embodiment is arranged horizontally.

The pipe 15 of each humidification module 13 has, along its extension, a plurality of nozzles 22 which are suitable to provide a water aerosol.

The nozzles 22 are substantially open onto a first opening 23 provided in the box-like container 14 and are oriented toward the outside of the first opening 23 along a preferential horizontal direction.

Advantageously, the nozzles 22, in this embodiment, are centered with respect to the first opening 23.

A cross-flow impeller 24 is provided inside the box-like container 14, is arranged along a rotation axis which is parallel to the pipe 15 and is suitable to draw air from a second opening 25 which is formed in an upper wall 26 of the box-like container 14 toward the first opening 23 along a direction which is substantially parallel to the ejection axis of the nozzles 22 (and therefore, according to the example being described, horizontally).

Optionally, in addition to the second opening 25, there may be additional intake openings in the box-like container 14, provided for example on the side walls of said container.

The impeller is of the type constituted by a cylindrical cage of longitudinal vanes 24a and therefore has a predominantly longitudinal extension.

Each nozzle 22 comprises a valve 27 which opens at a minimum preset pressure level of the flow being ejected, in order to limit the spilling of water which is not atomized into an aerosol when there is low pressure within the pipe 15.

The system further comprises a water flow control valve 28, which is associated with the inlet 16 of the pipe 15 of the first humidification module 13a of each humidification line 11, and a water discharge valve 29, which is associated with the outlet 18 of the pipe 15 related to the last humidification module 13b of the humidification lines 11.

The flow control valve 28 and the discharge valve 29 are of the electrically actuated type (electric valves) and are connected electrically to an electronic management and control unit 30; the volumetric pump 20 is further connected electrically to said control unit.

The flow control valve 28 is of the normally-closed on-off type, while the discharge valve 29 is of the normally-open on-off type.

Moreover, the humidification system comprises outside environment humidity and/or temperature sensors, not shown in the figures, which are functionally connected to the electronic management and control unit 30.

Figure 2:
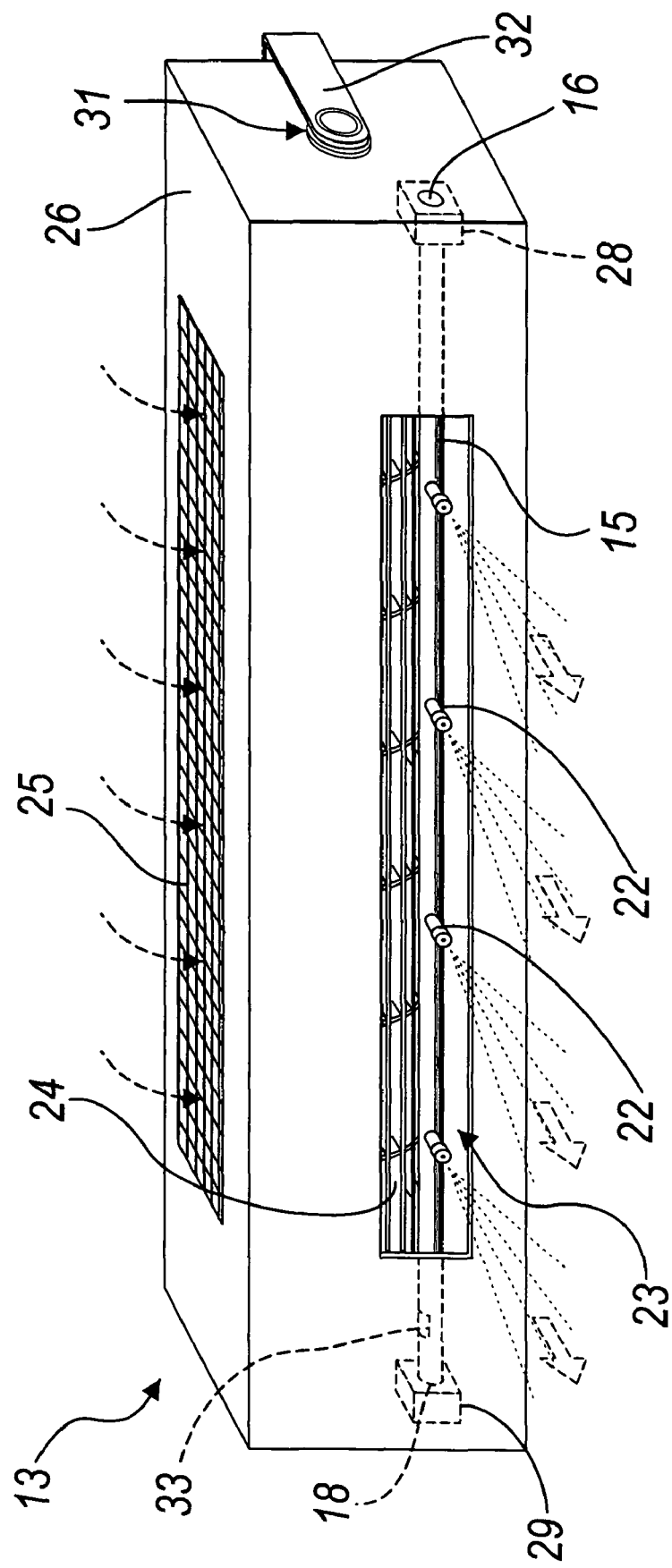
Figure 3:
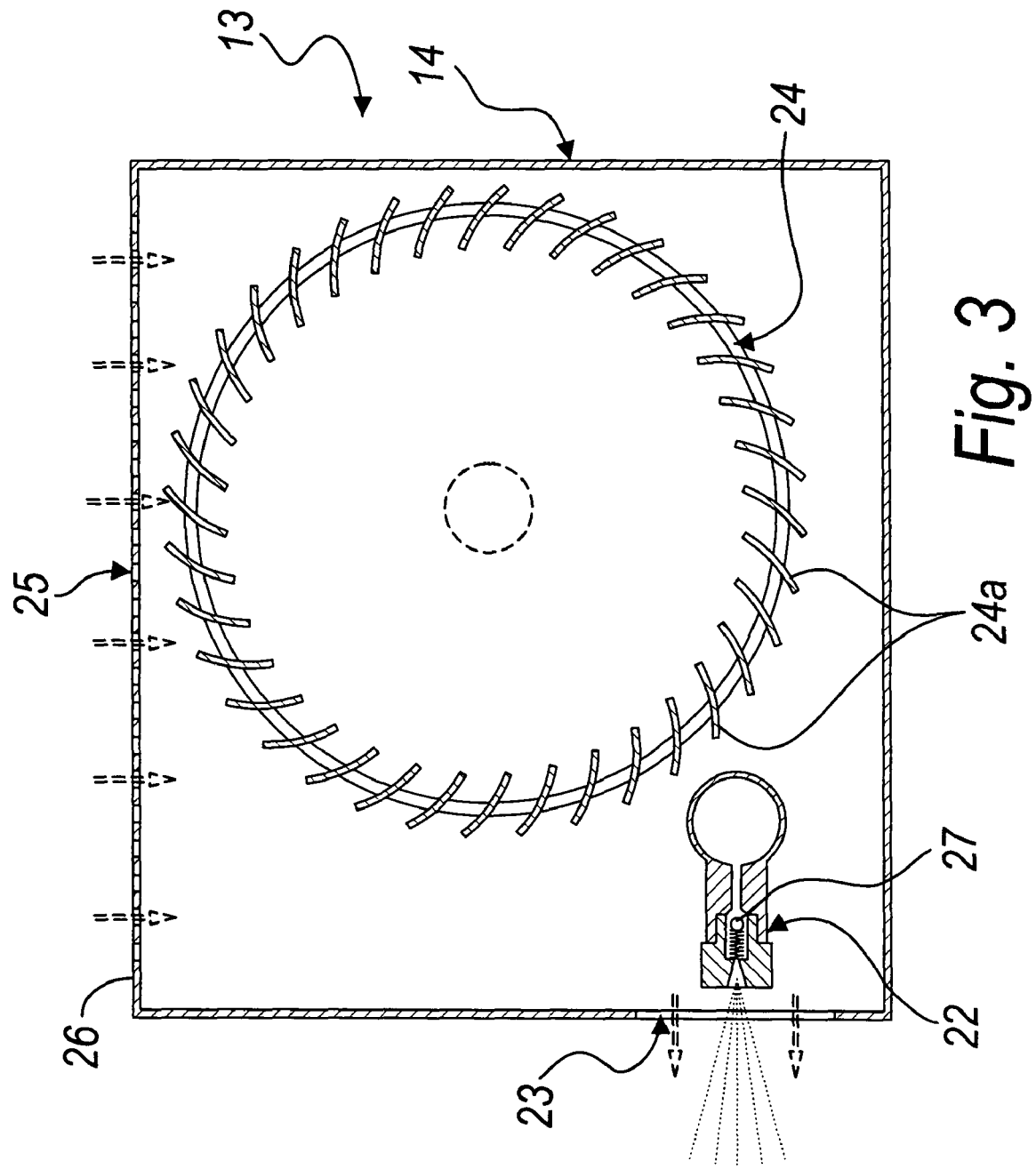

Advantageously, each humidification module is provided with adjustment means 31 for adjusting the orientation of the output flow of the water aerosol, which are constituted for example by two brackets 32 (only one is shown in FIG. 2) to be fixed to a supporting structure (not shown in the Figures), which are coupled rotatably on opposite sides of the box-like container 14 which correspond to the two sides which are perpendicular to the pipe 15; the brackets 32 allow to adjust the inclination of said box-like container and therefore of the first opening 23 with the nozzles 22 according to a preferred orientation about an axis which is parallel to the pipe 15.

Moreover, in the lowest point of the system, at the point where the vertical portion 21a of the duct 21 is connected to the portion 21b for connection to the volumetric pump 20, there is an additional discharge valve 34 which allows to empty the vertical portion 21a.

The operation of the humidification system is as follows.

Once the environmental parameters have been detected by the appropriate sensors, the control unit 30 drives the opening of the flow control valve 28 and of the discharge valve 29 of the humidification line 12 to be activated (even all the lines that are present) and drives the pumping means in order to fill the selected line 12 at low pressure; in this step, the nozzles do not produce aerosol and do not drip.

Once the line has been filled, the discharge valve is closed rapidly, thus leading to an extremely swift increase in pressure up to the optimum operating value (typically 70 bar).

The nozzles 22 begin to spray a water aerosol when said water has exceeded 7 bars gauge in the pipes, which is the activation pressure of the opening valve 27 of each nozzle.

Simultaneously, the impeller 24 is turned and provides an air stream which is propelled from the second opening 25 of the box-like container 14, in this embodiment horizontally, through the first opening 23, thus striking the jets of aerosol which are advantageously centered on the air stream, extending their path (the position of the nozzles in which they are centered on the air stream is the optimum position, but variations are not excluded in which the nozzles are not centered with respect to the first opening 23).

In the step for shutting down the system, the flow control valve 28 is closed and the discharge valve 29 is opened, emptying the line; the opening of the discharge valve 29 leads to a drop in pressure which is almost substantially instantaneous from 70 bars (operating pressure) to 0 bars, thus avoiding the dripping of water at pressures which are proximate to (but higher than) 7 bars (minimum opening pressure of the nozzles 22).

The system can comprise a pressure switch 33 inside one or more pipes 15 of the modules 13 of the line 11.

The pressure switch 33 is functionally sensing-driving connected to the valves 28 and 29 as explained hereinafter.

Detection of a preset value of water pressure by means of the pressure switch 33 within the duct constituted by the combination of the pipes 15 of the modules 13 of the line 11 allows to automate simply the operation of the system without the need for direct intervention of the control unit, since when a minimum pressure of the water (for example 30 bars) is detected, the pressure switch 33 drives the opening of the flow control valve, the closure of the discharge valve, and the actuation of the impeller.

If the humidification lines are very long, for example a few dozen meters, several discharge valves might be associated with a line (a variation which is not shown in the figures), said valves being distributed along the length of said line, in order to ensure an extremely swift pressure drop.

It is evident that the system can also be composed of a single humidification module 13, as shown in FIG. 2.

In this case, the water flow control valve 28 is associated with the inlet 16 of the pipe 15 of the single humidification module 13 and a water discharge valve 29 is associated with the outlet 18 of the pipe 15.

The temperature and/or humidity sensors are also associated with the single module and the pressure switch 33 inside the pipe 15 also is optionally associated therewith.

During production, each individual humidification module is preset to mount the components described so far; in particular, it is preset to mount at the inlet 16 and at the outlet 18 the flow control valve 28 and the discharge valve 29, so that according to requirements it is possible to configure a humidification module which can operate individually (by having both flow control and discharge valves) or operate in a humidification line as an initial module (by having only the flow control valve) or operate in a humidification line as a final module (by having only the discharge valve) or, finally, act as an intermediate humidification module (by having neither the flow control valve nor the discharge valve).

In practice it has been found that the invention thus described solves the problems noted above in known types of humidification system; in particular, the present invention provides a humidification system with corresponding humidification module which allows to avoid the problems of letting water fall to the ground.

This has been achieved mainly by introducing the flow control and discharge valves in input and in output to the humidification lines or within the individual humidification modules.

In particular, the association of said valves with each individual module allows to use said modules both individually and in combination with each other; the integration of said valves with the module allows to facilitate the installation of the system and the individual use of the modules.

Advantageously, the elongated shape of the box-like container and the use of a cross-flow impeller which has a longitudinal main extension allows to achieve high flow-rates with limited space occupation (with reference to a horizontal arrangement) both in terms of width and in terms of depth.

The presence of said flow control valves, in cooperation with the electronic control unit, allows to fill the lines only when humidification is required, to empty said lines when the need for humidification ceases, to wash automatically the lines at preset times and when there has been no demand for humidification for a long time, ensuring in this last case a high standard of hygiene without requiring manual washing and/or emptying procedures.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2006A000051 from which this application claims priority are incorporated herein by reference.

What is claimed is:

1. An air humidification system for large enclosed spaces, including at least one humidification line, constituted by at least one humidification module, that comprises: a box-shaped container; a water flow pipe located inside said container; water pumping means functionally connected at an inlet of said flow pipe; a water discharge space functionally connected at an outlet of said flow pipe; a plurality of nozzles located along an extension of said flow pipe and which are adapted to provide a water aerosol, said nozzles being open onto a first opening provided in said box-shaped container and being oriented toward an outside region of the container; an impeller that is provided within said box-shaped container and is suitable to aspirate air from at least one second opening provided in said box-shaped container and to form an air stream toward said first opening; a water flow control valve associated with the inlet of said pipe of a first said at least one humidification module that is arranged at an inlet of said line, and a water discharge valve associated with the outlet of said pipe of a second said at least one humidification module arranged at an outlet of said line.

2. The humidification system of claim 1, wherein said pipe runs substantially parallel to an extension of said first opening along a wall of said box-shaped container, said nozzles being provided centered substantially within said first opening, said impeller being of a cross-flow type and arranged along an axis of rotation which is substantially parallel to a longitudinal extension of said pipe, the air stream that is further output from said first opening being substantially parallel to an ejection axis of said nozzles.

3. The humidification system of claim 1, wherein said at least one humidification line is constituted by at least two of said at least one humidification module arranged in series to each other for inlet-to-outlet connection of said respective pipes thereof, said water flow control valve being associated with the inlet of the pipe of a first one of said at least two humidification modules of said humidification line, while said water discharge valve is associated with the outlet of the pipe of a last one of said at least two humidification modules of said humidification line.

4. The humidification system of claim 1, comprising an electronic management and control unit, said flow control valve and said discharge valve being electrically operated valves that are connected electrically to said control unit, said pumping means being connected electrically to said control unit.

5. The humidification system of claim 4, comprising a pressure switch which is arranged inside said pipe and is connected functionally to said water flow control valve and said water discharge valve.

6. The humidification system of claim 5, comprising external environment humidity and/or temperature sensors.

7. The humidification system of claim 1, wherein each of said nozzles comprises a valve which opens at a minimum preset level of pressure of a water flow that is ejected.

8. A module for humidifying air for enclosed spaces, comprising: a box-shaped container; a water flow pipe accommodated in said container; water pumping means functionally connected at an inlet of said pipe; a water discharge space connected at an outlet of said pipe; a plurality of nozzles provided along a longitudinal extension of said pipe and which are suitable to provide a water aerosol, said nozzles being open onto a first opening provided in a wall of said container and being oriented toward an outside region of said container; an impeller provided within said container that is suitable to draw air from at least one second opening provided in said container and to form an air stream toward said first opening; a receptacle for a water flow control valve being provided at the inlet of said pipe; and a water discharge valve that is associated at the outlet of said pipe.

9. The module for humidifying air for enclosed spaces of claim 8, wherein said pipe has the longitudinal extension thereof that is substantially parallel to a longitudinal extension of said first opening along said container wall, said nozzles being substantially centered within said first opening, said impeller being of a cross-flow type and being arranged along an axis of rotation which is substantially parallel to the longitudinal extension of said pipe, and the air stream being output from said first opening substantially parallel to an ejection axis of said nozzles.

10. A module for humidifying air for enclosed spaces, comprising a box-shaped container; a water flow pipe accommodated inside said container; water pumping means functionally connected at an inlet of said pipe; a water discharge space functionally connected to an outlet of said pipe; a plurality of nozzles provided along a longitudinal extension of said pipe to provide a water aerosol, said nozzles being open onto a first opening provided in a wall of said container and being oriented toward an outside region of said first container; an impeller provided within said container that is suitable to draw air from at least one second opening of said container and to form an air stream toward said first opening; and a water flow control valve that is provided at the inlet of said pipe.

11. The module for humidifying air for enclosed spaces of claim 10, wherein the longitudinal extension of said pipe is substantially parallel to a longitudinal extension of said first opening, said nozzles being centered within said first opening, said impeller being of a cross-flow type and arranged along an axis of rotation which is substantially parallel to said longitudinal extension of the pipe, and the air stream being output from said first opening substantially parallel to an ejection axis of said nozzles.

12. A module for humidifying air for enclosed spaces, comprising a box-shaped container; a pipe accommodated inside said container for water passage; water pumping means functionally connected to an inlet of said pipe; a water discharge space functionally connected to an outlet of said pipe; a plurality of nozzles provided along a longitudinal extension of said pipe to provide a water aerosol, said nozzles being open onto a first opening provided in a wall of said container and being oriented toward an outside region of said container; an impeller provided within said container to aspirate air from at least one second opening of said container and to form an air stream toward said first opening; and a water flow control valve provided at the outlet of said pipe.

13. The module for humidifying air for enclosed spaces of claim 12, wherein the longitudinal extension of said pipe is parallel to a longitudinal extension of said first opening, said nozzles are substantially centered within said first opening, said impeller is of a cross-flow type and arranged along a rotation axis which is substantially parallel to the longitudinal extension of said pipe, and the air stream is output from said first opening substantially parallel to an ejection axis of said nozzles.

14. A module for humidifying air for enclosed spaces, comprising a box-shaped container; a pipe accommodated in said container for water passage; water pumping means functionally connected at an inlet of said pipe; a water discharge space functionally connected to an outlet of said pipe; a plurality of nozzles provided along a longitudinal extension of said pipe to provide a water aerosol, said nozzles being open onto a first opening provided in a wall of said container and being oriented toward an outside region of said container; an impeller provided within said container to aspirate air from at least one second opening provided in said container and to form an air stream toward said first opening; a water flow control valve provided at the inlet of said pipe; and a water discharge valve provided at the outlet of said pipe.

15. The module for humidifying air for enclosed spaces of claim 14, wherein the longitudinal extension of said pipe is substantially parallel to a longitudinal extension of said first opening, said nozzles are substantially centered within said first opening, said impeller is of a cross-flow type and arranged along a rotation axis which is substantially parallel to the longitudinal extension of said pipe, and the air stream is output from said first opening substantially parallel to an ejection axis of said nozzles.

16. The module for humidifying air for enclosed spaces of claim 15, wherein said flow control valve and said discharge valve are electrically operated valves.

17. The module for humidifying air for enclosed spaces of claim 16, further comprising a pressure switch, arranged inside said pipe that is functionally connected to said water flow control valve and said water discharge valve.

18. The module for humidifying air for enclosed spaces of claim 17, comprising external environment humidity and/or temperature sensors.

19. The module for humidifying air for enclosed spaces of claim 17, wherein each one of said nozzles comprises a valve suitable for opening at a preset minimum level of pressure of an ejection flow.

20. The module for humidifying air for enclosed spaces of claim 14, wherein said box-shaped container has a shape which is elongated in a main direction, said cross-flow impeller having a predominantly longitudinal extension which is parallel to the axis of rotation thereof.

21. The module for humidifying air for enclosed spaces of claim 20, wherein each humidification module is provided with adjustment means for adjusting an orientation of an output flow of the water aerosol.

22. The module for humidifying air for enclosed spaces of claim 21, wherein said adjustment means for adjusting the orientation of the water aerosol output flow are constituted by two brackets which are coupled rotatably on mutually opposite sides of said container, which correspond to two sides thereof which are perpendicular to said pipe.

* * * * *